(12) United States Patent
Gossard et al.

(10) Patent No.: US 11,486,541 B2
(45) Date of Patent: Nov. 1, 2022

(54) BEARING LUBRICATOR, CONTROLLER AND ASSOCIATED METHOD

(71) Applicant: Regal Beloit America, Inc., Beloit, WI (US)

(72) Inventors: Bradford Kyle Gossard, Cincinnati, OH (US); Thomas John Fistrovich, Crown Point, IN (US); Matthew Ivan Lewis, Bloomington, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 963 days.

(21) Appl. No.: 16/222,296

(22) Filed: Dec. 17, 2018

(65) Prior Publication Data

US 2019/0120425 A1    Apr. 25, 2019

Related U.S. Application Data

(63) Continuation-in-part of application No. 15/165,321, filed on May 26, 2016, now abandoned.

(51) Int. Cl.
*F16N 29/02* (2006.01)
*F16C 33/66* (2006.01)

(52) U.S. Cl.
CPC .......... *F16N 29/02* (2013.01); *F16C 33/6659* (2013.01); *F16C 33/6625* (2013.01);
(Continued)

(58) Field of Classification Search
CPC .. F16N 29/02; F16N 2210/14; F16N 2270/20; F16N 2270/70; F16C 33/6659;
(Continued)

(56) References Cited

U.S. PATENT DOCUMENTS 1,898,880 A    10/1931  Leis
2,507,579 A     5/1950  Scott
(Continued)

FOREIGN PATENT DOCUMENTS

WO    2010077282 A1    7/2010

OTHER PUBLICATIONS

1st Substantive Examination Requirement for Patent Application MX/a/2017/006948 dated Oct. 8, 2021; 8 pp.

*Primary Examiner* — Gene O Crawford
*Assistant Examiner* — Emily R Kincaid
(74) *Attorney, Agent, or Firm* — Armstrong Teasdale LLP

(57) ABSTRACT

A bearing lubricator for lubricating a plurality of device bearings in a device includes a solitary monitored bearing and at least one unmonitored bearing. The bearing lubricator includes a reservoir configured to contain lubricant, a plurality of conduits connecting the reservoir to the plurality of bearing, and a mechanism connected to the reservoir for advancing the lubricant from the reservoir to the plurality of device bearings when actuated. The bearing lubricator further includes a solitary sensor for sensing a variable of the monitored bearing and a controller. The controller stores a triggering value of the variable of the monitored bearing. The mechanism advances a substantially identical quantity of the lubricant from the reservoir to each of the plurality of bearings when a signal indicative of the variable is advanced to the controller and when that signal indicates the triggering value of the variable has been met.

20 Claims, 7 Drawing Sheets

(52) U.S. Cl.
CPC ...... *F16C 2233/00* (2013.01); *F16C 2326/58* (2013.01); *F16N 2210/14* (2013.01); *F16N 2270/20* (2013.01); *F16N 2270/70* (2013.01)

(58) Field of Classification Search
CPC .............. F16C 33/6625; F16C 2233/00; F16C 2326/58
USPC .......................................................... 184/6.1
See application file for complete search history.

(56) References Cited

U.S. PATENT DOCUMENTS

| | | | |
|---|---|---|---|
| 3,277,001 A | 10/1966 | Fischer | |
| 4,312,424 A | 1/1982 | Scott | |
| 4,886,144 A | 12/1989 | Wengeler | |
| 5,086,877 A | 2/1992 | Synatschke et al. | |
| 5,671,825 A * | 9/1997 | Wong | F16N 29/02 184/7.4 |
| 6,561,316 B1 * | 5/2003 | Graf | F16C 19/525 184/38.4 |
| 8,783,418 B2 | 7/2014 | Orlitzky et al. | |
| 9,303,814 B2 | 4/2016 | Ifield et al. | |
| 9,316,252 B2 | 4/2016 | Emlind et al. | |
| 2003/0115977 A1 * | 6/2003 | Holweg | F16C 19/52 702/113 |
| 2004/0250623 A1 * | 12/2004 | Walker | F16C 33/102 73/593 |
| 2007/0137936 A1 | 6/2007 | Akechi et al. | |
| 2012/0221153 A1 * | 8/2012 | Emlind | F16C 19/52 702/45 |
| 2016/0186812 A1 * | 6/2016 | Conley | F16N 29/02 184/6.1 |
| 2016/0290848 A1 | 10/2016 | Conley et al. | |
| 2016/0369782 A1 | 12/2016 | Lee | |
| 2017/0038003 A1 | 2/2017 | Conley | |

\* cited by examiner

BEARING LUBRICATOR, CONTROLLER AND ASSOCIATED METHOD

CROSS REFERENCE TO RELATED APPLICATION

This application is a continuation-in-part, non-provisional application and claims priority to U.S. Utility patent application Ser. No. 15/165,321 filed May 26, 2016 for "BEARING LUBRICATOR, CONTROLLER AND ASSOCIATED METHOD" and published as US 2017/0343157 A1 on Nov. 30, 2017, which is hereby incorporated by reference in its entirety.

BACKGROUND OF THE INVENTION

The embodiments described herein relate generally to bearing assemblies, and more specifically, to bearing assemblies with a mechanism for adding lubrication to a bearing.

Bearing assemblies permit the relative motion of one component or assembly with respect to another component or assembly. The bearing assembly typically has a first component, for example an inner ring. The inner ring may be fixed to a first component and to a second component, for example, an outer ring that is fixed to a second component. The first component has relative motion, typically to rotate, relative to the second component.

The rotation of the second component may be permitted by providing mating cylindrical surfaces between the components, where are typically known as sleeve bearings, as one of the two components is typically sleeved with a material that provides low friction rotation between the moving components.

Alternatively, a widely used configuration to permit rotation between the components is in the form of a set of rolling elements that are positioned between the cylindrical surface of one component and the cylindrical surface of the second component. The rolling element may be balls, needles, cylinders or cylinders with spherical outer peripheries, also known as spherical rollers. A single row of rolling elements may be used, or two or more rows of rolling elements may be used in a spaced apart configuration. The rolling elements may be placed in an adjoining relationship on the outer periphery of the inner element and on the inner periphery of the outer element. Alternatively, the rolling elements may be positioned in a spaced apart relationship, separated from each other by a separator in the form of a retainer or cage. The rolling elements and the inner element, ring or race and the outer element, ring or race form a rolling element bearing.

Many bearing assembly applications provide for the rotation of the inner element that is secured to a shaft while the outer element is secured to a housing. Typically, the inner element rotates, but many applications provide for the outer element rotating and the inner element stationary.

Often the bearing assembly is mounted in a housing and the inner element is secured to a shaft. The housing may be in the form of a housing with a mounting arrangement for mounting to a surface with fasteners. Such a housing may be in the form of a flange housing, a hanger housing, a take-up housing or a surface mount housing, also known as a pillow block.

For many bearing applications, a lubricant, typically in the form of an oil or a grease, is positioned in the bearing cavity to reduce friction, to deter the egress of contamination and to purge the bearing of contamination. While in some application the lubricant is added during manufacture of the bearing and never replenished, in many applications, particularly those with large expensive bearings or those in industrial application, the lubricant is periodically purged, replaced, or replenished.

Typically, the replenishing of lubricant is done manually by greasing the bearings each individually with a grease gun that manually adds grease to each bearing separately through a fitting or zerk. Such a process is expensive and, because of this expense, may not be done sufficiently to optimize bearing life. In addition, the frequency of greasing and the amount to apply to each bearing is hard to optimize due to widely varying conditions in the application of the bearings.

While attempts have been made to provide systems that automate, at least partially, the delivery of lubricant to bearings, these systems are expensive to purchase and to install, hard to financially justify, and difficult to maintain. These systems require sensors at each bearing so that the proper amount of lubricant is applied to each bearing further adding to the cost of these systems.

The present invention is directed to alleviate at least some of these problems with the prior art.

BRIEF DESCRIPTION OF THE INVENTION

According to an aspect of the invention, a bearing lubricator for lubricating a lubricated bearing is provided. The bearing lubricator includes a reservoir configured to contain lubricant and a conduit connected to the reservoir and to the bearing. The bearing lubricator also includes a mechanism operably connected to at least one of reservoir and the conduit. The mechanism is adapted to advance the lubricant from the reservoir to the conduit when actuated. The bearing lubricator also includes a controller. The controller is adapted to store a triggering value of a parameter. The controller further adapted to actuate the mechanism when a signal indicative of the triggering value is advanced to the controller. The bearing lubricator also includes a sensor operably connected to the controller. The sensor is adapted to measure a parameter of a measured bearing. The sensor is also adapted to send a signal to the controller indicative of the value of the parameter.

According to another aspect of the invention, the bearing lubricator may be provided wherein the measured bearing and the lubricated bearing are the one in the same.

According to another aspect of the invention, the bearing lubricator may be provided wherein the measured bearing and the lubricated bearing are subjected to a similar load and a similar speed.

According to another aspect of the invention, the bearing lubricator may be provided wherein the measured bearing and the lubricated bearing support the same shaft.

According to another aspect of the invention, the bearing lubricator may be provided wherein said controller is adapted to store a triggering value of a second parameter, said controller further adapted to actuate the mechanism when a signal indicative of the triggering value of a second parameter is advanced to the controller.

According to another aspect of the invention, the bearing lubricator may be provided wherein said controller is adapted to actuate the mechanism only when a signal indicative of the triggering value of a second parameter is advanced to the controller and when a signal indicative of the triggering value of the first mentioned parameter is advanced to the controller.

According to another aspect of the invention, the bearing lubricator may be provided wherein the parameter includes one of temperature, vibration, and grease oxidation.

According to another aspect of the invention, the bearing lubricator may be provided wherein the mechanism adapted to advance the lubricant from the reservoir to the conduit may be adjusted to vary the amount of lubricant advanced from the reservoir when actuated.

According to another aspect of the invention, the bearing lubricator may be provided wherein the parameter may be pre-programmed.

According to another aspect of the invention, the bearing lubricator may be provided wherein the controller is adapted to prevent the actuation the mechanism until a minimal time has elapsed after the previous actuation of the mechanism.

According to another aspect of the invention, the bearing lubricator may be provided wherein the minimal time may be pre-programmed.

According to another aspect of the invention, the bearing lubricator may be provided wherein the controller may be adapted to actuate the mechanism when a signal is received by the controller indicating an emergency lubrication is needed.

According to another aspect of the invention, the bearing lubricator may be provided wherein the lubricator is adapted to lubricate a plurality of bearings.

According to another aspect of the invention, the bearing lubricator may be provided wherein the lubricator is attached to the lubricated bearing.

According to another aspect of the invention, the bearing lubricator may be provided wherein the controller is adapted to communicate with a remote device utilizing one of the communication protocols of Protocols of BLUETOOTH, wireless, ZIGBEE, 6LOWPAN and HART.

According to another aspect of the invention, the bearing lubricator may be provided wherein the controller is adapted to communicate with at least one of a computer, a smart phone, other controllers, other lubricators and the Cloud.

According to another aspect of the invention, a controller for controlling a bearing lubricator for lubricating a lubricated bearing is provided. The bearing lubricator includes a reservoir configured to contain lubricant, a conduit connected to the reservoir and to the bearing, and a mechanism operably connected to at least one of reservoir and the conduit. The mechanism is adapted to advance the lubricant from the reservoir to the conduit when actuated. The bearing lubricator also includes a sensor operably connected to the controller. The sensor is adapted to measure a parameter of a measured bearing. The sensor is also adapted to send a signal to the controller indicative of the value of the parameter. The controller is adapted to store a triggering value of a parameter. The controller is further adapted to actuate the mechanism when a signal indicative of the triggering value is advanced to the controller.

According to another aspect of the invention, the controller may be provided wherein the controller is adapted to store a triggering value of a second parameter. The controller further adapted to actuate the mechanism when a signal indicative of the triggering value of a second parameter is advanced to the controller.

According to another aspect of the invention, the controller may be provided wherein the controller is adapted to actuate the mechanism only when a signal indicative of the triggering value of a second parameter is advanced to the controller and when a signal indicative of the triggering value of the first mentioned parameter is advanced to the controller.

According to another aspect of the invention, a method for lubricating a lubricated bearing is provided. The method includes the steps of containing lubricant in a reservoir, storing a triggering value of a parameter in a controller and advancing a signal indicative of the triggering value to the controller. The method also includes the steps of actuating a mechanism adapted to advance the lubricant from the reservoir to the conduit when the signal indicative of the triggering value is advanced to the controller and advancing the lubricant through a conduit to the lubricated bearing with the mechanism.

According to another aspect of the invention, a bearing lubricator for lubricating a plurality of device bearings in a device is provided. The plurality of device bearings includes a solitary monitored bearing and at least one unmonitored bearing. The bearing lubricator includes a reservoir configured to contain lubricant, a plurality of conduits connecting the reservoir to the plurality of bearing, and a mechanism connected to the reservoir for advancing the lubricant from the reservoir to the plurality of device bearings when actuated.

The bearing lubricator further includes a solitary sensor for sensing a variable of the monitored bearing and a controller. The controller stores a triggering value of the variable of the monitored bearing. The controller further actuates the mechanism to advance a substantially identical quantity of the lubricant from the reservoir to each of the plurality of bearings when a signal indicative of the variable is advanced to the controller and when that signal indicates the triggering value of the variable has been met.

According to another aspect of the invention, the bearing lubricator may be provided wherein the solitary monitored bearing and the at least one unmonitored bearing are subjected to a similar load and a similar speed.

According to another aspect of the invention, the bearing lubricator may be provided wherein the solitary monitored bearing and the at least one unmonitored bearing support the same shaft.

According to another aspect of the invention, the bearing lubricator may be provided wherein the controller is adapted to store a triggering value of a second parameter, the controller further adapted to actuate the mechanism when a signal indicative of the triggering value of a second parameter is advanced to the controller.

According to another aspect of the invention, the bearing lubricator may be provided wherein the controller is adapted to actuate the mechanism only when a signal indicative of the triggering value of a second parameter is advanced to the controller and when a signal indicative of the triggering value of the first mentioned parameter is advanced to the controller.

According to another aspect of the invention, the bearing lubricator may be provided wherein the parameter includes one of temperature, vibration, and grease oxidation.

According to another aspect of the invention, the bearing lubricator may be provided wherein the mechanism adapted to advance the lubricant from the reservoir to the conduit may be adjusted to vary the amount of lubricant advanced from the reservoir when actuated.

According to another aspect of the invention, the bearing lubricator may be provided wherein the controller includes an adjustable timer for storing a delay time and wherein the controller prevents the actuation the mechanism until a delay time has elapsed after the previous actuation of the mechanism.

According to another aspect of the invention, the bearing lubricator may be provided wherein the delay time may be pre-programmed.

According to another aspect of the invention, the bearing lubricator may be provided wherein the controller is adapted to actuate the mechanism when a signal is received by the controller indicating an emergency lubrication is needed.

According to another aspect of the invention, the bearing lubricator may further include a second monitored bearing, spaced from the first mentioned solitary monitored bearing, wherein the lubricator lubricates the second monitored bearing.

According to another aspect of the invention, the bearing lubricator may further include a second plurality of unmonitored bearings, spaced from the first mentioned plurality of unmonitored bearings, wherein the lubricator is adapted to lubricate the second plurality of unmonitored bearings when the second monitored bearing is lubricated.

According to another aspect of the invention, the bearing lubricator may be provided wherein the controller is adapted to communicate with a remote device utilizing one of the communication protocols of Protocols of Bluetooth, Wireless, Zigbee, 6lopan, and Hart.

According to another aspect of the invention, the bearing lubricator may be provided wherein the controller is adapted to communicate with at least one of a computer, a smart phone, other controllers, other lubricators and the cloud.

According to another aspect of the invention, a system is provided. The system includes a solitary monitored bearing subjected to a first load cycle and a similarly loaded unmonitored bearing. The similarly loaded unmonitored bearing is subjected to a second load cycle similar to the first load cycle. The system includes a bearing lubricator.

The system also includes a bearing lubricator for lubricating the similarly loaded unmonitored bearing and for lubricating the solitary monitored bearing. The bearing lubricator includes a reservoir configured to contain lubricant and a plurality of conduits connecting the reservoir to the similarly loaded unmonitored bearing and to the solitary monitored bearing. The bearing lubricator also includes a mechanism connected to the reservoir for advancing the lubricant from the reservoir to the similarly loaded unmonitored bearing and to the solitary monitored bearing when actuated.

The bearing lubricator also includes a solitary sensor for sensing a variable of the monitored bearing and a controller. The controller stores a triggering value of the variable of the monitored bearing. The controller further actuates the mechanism to advance a quantity of the lubricant from the reservoir to the similarly loaded unmonitored bearing and to the solitary monitored bearing when a signal indicative of the variable is advanced to the controller and when that signal indicates the triggering value of the variable has been met.

According to another aspect of the invention, the system may be provided wherein the solitary monitored bearing and the similarly loaded unmonitored bearing support the same shaft.

According to another aspect of the invention, the system may further include a second similarly loaded unmonitored bearing. The similarly loaded unmonitored bearing is subjected to a third load cycle similar to the first load cycle.

According to another aspect of the invention, the system may be provided wherein the controller includes an adjustable timer for storing a delay time and wherein the controller prevents the actuation the mechanism until a delay time has elapsed after the previous actuation of the mechanism.

According to another aspect of the invention, a method for lubricating a plurality of device bearings in a device is provided. The plurality of device bearings including a subjected to a first load cycle and at least one unmonitored bearing.

The method includes the steps of positioning a sensor adjacent the solitary monitored bearing, measuring a variable of the solitary monitored bearing with the sensor and providing a controller.

The method further includes the steps of storing a triggering value of the variable of the monitored bearing in the controller, advancing a signal indicative of the value of the variable of the solitary monitored bearing to the controller, providing a reservoir and containing lubricant in the reservoir.

The method further includes the steps of providing a mechanism for advancing the lubricant and providing conduits for conveying the lubricant. The method further includes the steps of selecting from the unmonitored bearings, at least one similarly loaded unmonitored bearing. Each of the least one similarly loaded unmonitored bearings is subject to a load cycle similar to the first load cycle.

The method further includes the steps of connecting the reservoir to the at least one similarly loaded unmonitored bearings and to the solitary monitored bearing with the conduits and actuating the mechanism to advance the lubricant from the reservoir to the solitary monitored bearing and to the at least one similarly loaded unmonitored bearing when the signal advanced to the controller is indicative of the triggering value.

According to another aspect of the invention, the method may further include the steps of providing an adjustable timer for storing a delay time and preventing the actuation the mechanism with the controller until the delay time has elapsed after the previous actuation of the mechanism.

DETAILED DESCRIPTION OF THE INVENTION

The method, systems and apparatus described herein facilitate the lubrication of a bearing.

The methods, systems, and apparatus described herein assist in lubrication bearings. The methods, systems, and apparatus described herein may also facilitate the monitoring of condition of bearings in a device. Furthermore, the methods, systems, and apparatus described herein provide for reduced maintenance cost and improved reliability of a device.

Technical effects of the methods, systems, and apparatus described herein include improved performance and/or quality and/or reduced labor costs.

Figure 1:
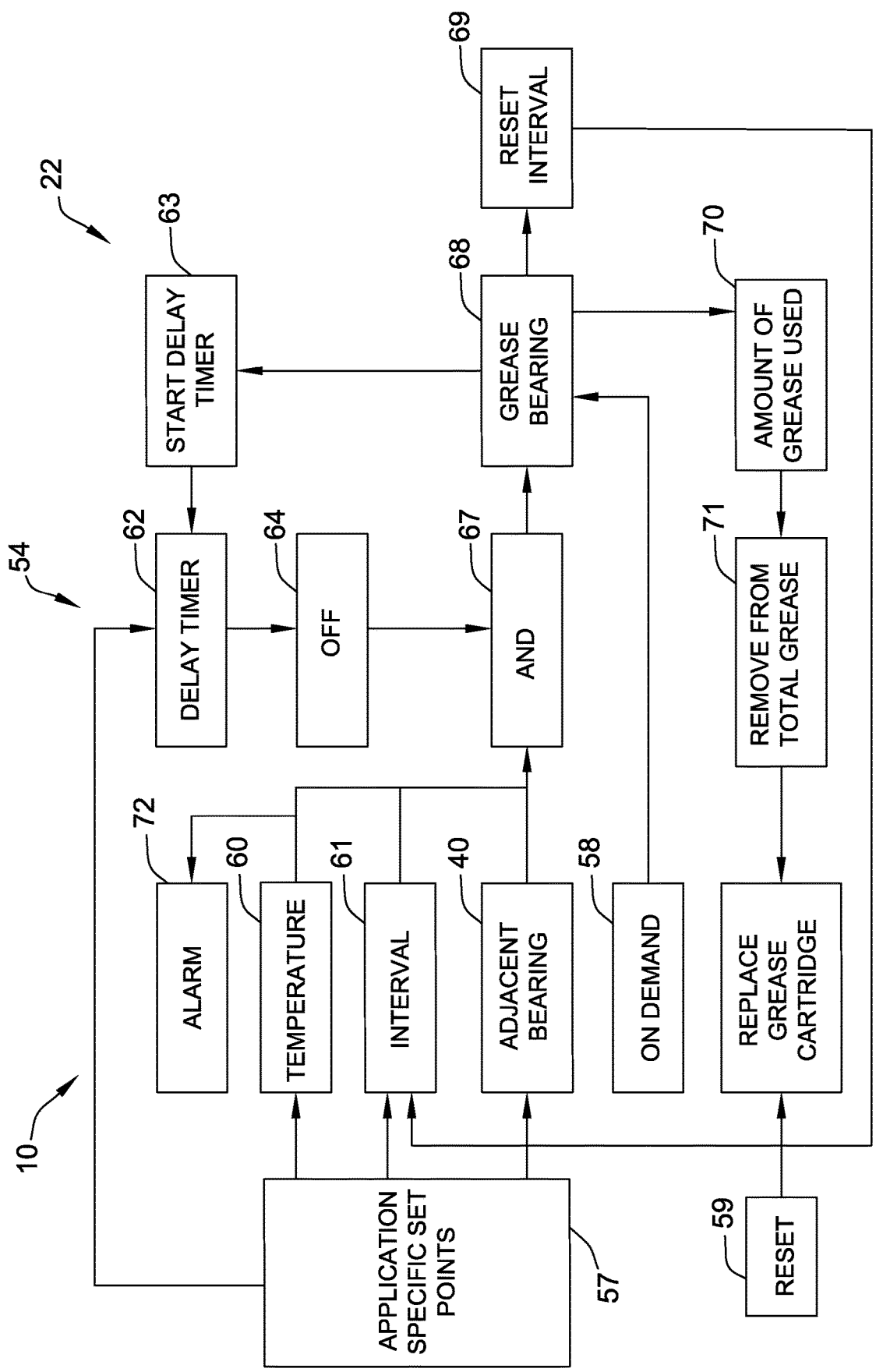
FIG. 1 is a plan view of an embodiment of the present invention in the form of a bearing lubricator.
Figure 2:
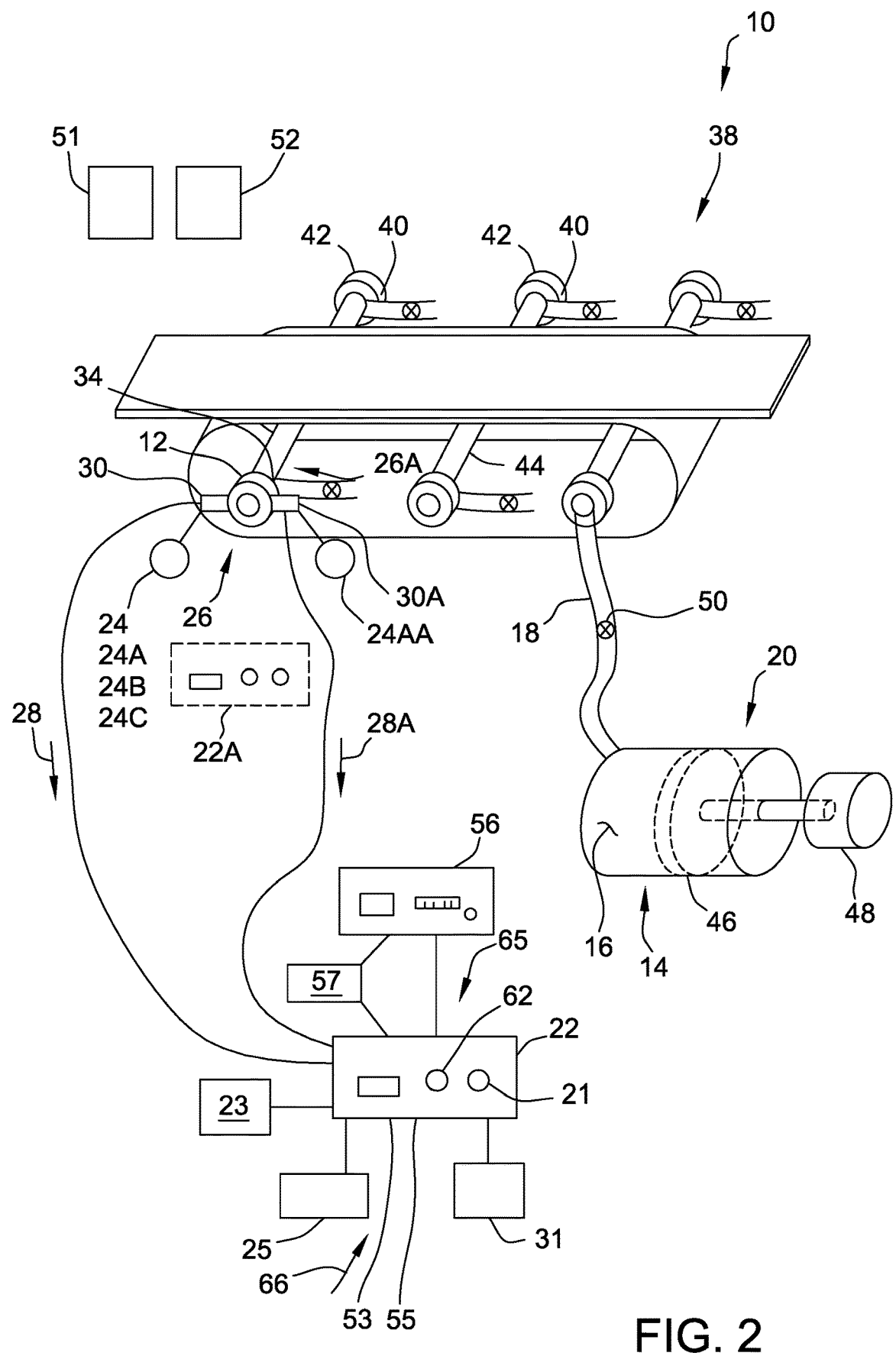
FIG. 2 is a block diagram of the bearing lubricator of FIG. 1.

Referring now to FIGS. 1 and 2 according to an aspect of the invention, a bearing lubricator 10 for lubricating a lubricated bearing 12 is provided. The bearing lubricator 10 includes a reservoir 14 configured to contain lubricant 16 and a conduit 18 connected to the reservoir 14 and to the lubricated bearing 12. The bearing lubricator 14 also includes a mechanism 20 operably connected to the reservoir 14 and/or the conduit 18. The mechanism 20 is adapted to advance the lubricant 16 from the reservoir 14 to the conduit 18 when actuated. The bearing lubricator 10 also includes a controller 22. The controller 22 is adapted to store a triggering value 24 of a first parameter 26. The controller 22 further adapted to actuate the mechanism 20 when a triggering value met signal 28 indicative of the triggering value 24 is advanced to the controller 22.

It should be appreciated that the triggering value 24 may be a lubrication trigger met value 24A, when lubrication is to be provided by the lubricator 10, when other conditions are met, a lubrication needed now or emergency triggering value 24B, when lubrication is to be provided by the lubricator 10 immediately, and a shut down or emergency triggering value 24C, when operation of the device 38 is in emergency.

While as shown in FIG. 2, the controller 22 is separated from the measured bearing, for reasons including to provide simplicity and to reduce costs, the controller 22 may be in the form of a controller 22A, identical to controller 22 and positioned adjacent to or attached to the measured bearing 34 or to the lubricated bearing 12.

The controller 22 in the bearing lubricator 10 can be configured such that the parameter 26 may be pre-programmed by the manufacturer, by the lubricator installer or by the user.

The bearing lubricator 10 also includes a sensor 30 operably connected to the controller 22. The sensor 30 is adapted to measure the parameter 26 of a measured bearing 34. The sensor 30 is also adapted to send the first parameter triggering value met signal or first parameter sensor signal 28 to the controller 22 indicative of the value of the parameter 26.

The bearing lubricator 10 may be utilized for lubricating any bearing in any application. The bearing lubricator 10 may be provided such that a plurality of bearings is connected to the lubrication. For example, and as is shown in FIG. 2, the bearing lubricator 10 may be operably connected to a device 38 that includes other bearing 40 that are separate from the measured bearing 34 and the lubricated bearing 12.

The device 38 may be any device and may be a device that utilizes many bearings that may be subjected to heavy loads and located in an environment with contamination that may harm the bearings. For example, the device 38 may, as shown, be a conveyor 38 for conveying loose materials, such as gravel or iron ore. The device 38 may similarly be a rolling mill for making steel sheet or other steel structural items.

The other bearings 40 may include bearings such as second bearing 42 that is located on the same shaft or axle 44 as that of the measured bearing 34 and the lubricated bearing 12. As shown in FIG. 2, the bearing lubricator 10 may be provided wherein the measured bearing 34 and the lubricated bearing 12 are the one in the same. Alternatively, the measured bearing and the lubricated bearing may be different spaced apart bearings.

For example, the measured bearing and the lubricated bearing may be on opposite end of the same shaft or axle. In such arrangements, the measured bearing and the lubricated bearing are subjected to the same speed and similar loads making the measurements of the measured bearings a good indicator of the measurement of the lubricated bearing.

For example, the measured bearing and the lubricated bearing may be on separate spaced apart shafts or axles. In such arrangements, where shafts or axles may be used for devices, such as the conveyor 38, the measured bearing and the lubricated bearing are subjected to the same speed and similar loads. For these arrangements, the measurements of the measured bearings may be a good indicator of the condition of all the similarly loaded lubricated bearings operating at a similar speed.

The reservoir 14 and mechanism 20 may be specially made for this application or may be any reservoir and mechanism capable of storing and advancing lubricant, provided such a device may be controlled by controller 22.

The reservoir 14 may be generally cylindrical, although other shapes, such as rectangular, may be used.

The mechanism 20 may include a plunger or piston 46 that may be actuated by an electric motor 48 connected to controller 22. As the piston 46 slides inwardly in reservoir 14, the lubricant 16 is urged into conduit 18 attached to the reservoir 14.

The bearing lubricator 22 may be provided wherein the mechanism 20 may be adapted to advance the lubricant 16 from the reservoir 14 to the conduit 18 in a manner such that mechanism 20 may be adjusted to vary the amount of lubricant 16 advanced from the reservoir 14 when actuated. Such adjustment may be done manually within the mechanism 20 or through the use of a valve or valves 50. Alternatively, the adjustment may be made automatically based on feedback from the sensor 30 as programmed in the controller 220 or based on instructions inputted at a user interface 56.

The bearing lubricator 10 may further include one or more of the valves 50. The valves serve to provide additional control of the amount of lubricant advancing toward the bearing downstream of the valve. To provide individual control and adjustment of lubricant to each bearing 40, the bearing lubricator 10 may be configured as shown in FIG. 2 with a valve 50 positioned in the conduit 18 and associated with each bearing 40.

It should be appreciated that the valves 50 may be manually set or automatically set by signals (not shown) from the controller 22. The valves may be preset, manually or automatically so that lubrication is uniformly distributed to all bearings 40 whenever the mechanism 20 is actuated. Alternatively, multiple sensors 30 may be used adjacent each or several of the bearings 40 and feedback signals from these multiple sensors be sent to the controller 22 and the controller sends signals back to the valves 50 so that the respective valves are individual adjusted for optimum greasing of each bearing 40.

The controller 22 may be any controller capable of receiving signals from sensors or other devices, processing such signals and sending command signals to the mechanism to actuate the mechanism and lubricate the bearings 40. The controller 22 may be specifically designed for this application or may be any suitable commercially available controller.

The bearing lubricator may further include a timer 21. The timer 21 may be a separate component. Alternatively, the timer 21 may, as shown, be a part of the controller 22. The timer 21 may be used, for example, to provide lubrication after a predetermined time or to prohibit lubrication too soon after a prior lubrication.

The bearing lubricator may further include an actuator 23. The actuator 23 may be a separate component. Alternately, the actuator 23 may, as shown, be a part of the controller 22.

The actuator 23 may be used, for example, to provide lubrication to the bearings 40 when actuated, either manually or automatically.

It should be appreciated that the triggering value 24 may be a lubrication trigger met value 24A, when lubrication is to be provided by the lubricator 10, when other conditions are met, a lubrication needed now or emergency triggering value 24B, when lubrication is to be provided by the lubricator 10 immediately, and a shut down or emergency triggering value 24C, when operation of the device 38 is in emergency.

The controller 22 of the bearing lubricator 10 may be further configured to provide for an emergency lubrication. When the parameter 26 measured by the sensor 30 of the lubricator 10 reaches the lubrication needed now or emergency triggering value 24B, the controller 22 may be adapted to actuate the mechanism 20 immediately.

The bearing lubricator 10 may be further configured to provide for an emergency shut-down 25. The shut-down 25 may be a separate component or may, as shown, be a part of the controller 22. When the parameter 26 measured by the sensor 30 of the lubricator 10 reaches the shut down or emergency triggering value 24C, the shut-down 25 may be configured, for example, to stop, cycle down or otherwise disable the device 38.

The sensor 30 may be any sensor capable of sensing parameter or characteristic 26 of the measured bearing 12, the device 38 or environment 52. Such parameters or characteristics 26 may include temperature, vibration, general oxidation, humidity, oxygen, light, noise, atmospheric pressure, magnetic field, electric field, grease quantity, and grease quality. Sensors for such parameters or characteristics 26 may include, respectively, temperature sensors, vibration sensors, oxidation sensors, humidity sensors, oxygen sensors, light sensors, noise sensors, atmospheric pressure sensors, magnetic field sensors, and electric field sensors, grease quantity sensors, and grease quality sensors. It should be appreciated to keep a bearing properly lubricated, measuring the temperature and/or the vibration of the bearing may be particularly advantageous.

The lubricator 10 may further include an alarm 31. The alarm may be operably connected to the sensor 30 and may be used to warn of excessive values of the parameter 26. The alarm 31 may be connected to shut-down 25.

While, as shown in FIG. 2, the bearing lubricator 10 includes a sole or solitary sensor 30 that cooperates with measured bearing 34, it should be appreciated that additional bearings 40 such as second bearing 42 may also have a sensor that cooperates with that bearing and directly measures the parameter of that bearing. The inventors have discovered that a sole sensor or a limited number of sensors may be used with a series of bearings 40 that are utilized in device 38 in an application where the series of bearings are subjected to a similar load and speed. The use of a sole sensor reduces the initial cost, installation costs, and maintenance cost of such a bearing lubricator.

Referring to FIGS. 1 and 2, the bearing lubricator 10 may operate as shown. For this description the parameter 26 will be described as temperature 26. It should be appreciated that the lubricator 10 may operate with the parameter 26 being any parameter including those parameters described above. Likewise, the sensor 30 will be described as a temperature sensor 30, while other corresponding sensors may likewise be used.

FIG. 1 shows flowchart 54 for use with the lubricator 10 of FIG. 2. The controller 22 of the lubricator 10 may include the user interface 56. Alternatively, the user interface 56 may be a separate component.

The controller 22 may be adapted to communicate with remote device 51. The remote device 51 may be attached physically to the controller 22 or may not be attached to the controller 22. The remote device 51 may be computer, a smart phone, other controllers, other lubricators and/or the Cloud. Such communication may be-through the user interface 56 or directly with the controller 22. Note that such indirect communication may be in addition to or instead of the user interface 56 connected to the lubricator 10.

The controller 22 may be adapted to communicate with the remote device 51 utilizing any available communication protocols. For example, the controller 22 may be adapted to communicate with the protocols of BLUETOOTH, wireless, ZIGBEE, 6LOWPAN, and/or HART.

The user interface 56 receives information from a user as to how the lubricator is to operate. For example, the user interface receives application specific set points 57. Such set points 57 may include grease capacity, grease application amount, apply grease temperature, minimum time between greasing, desired greasing interval, which bearings to control (apply grease).

When initiating operation of the bearing lubricator and after the application specific set points are set, the operator replaces the grease cartridge at flow chart box 58. The operator may then apply grease to the bearings 40 by actuating the actuator 23 until the conduits 18 are filled and grease has sufficiently reached the bearings 40 as shown in the flowchart 54 at flow chart box 58.

Next, the bearing lubricator 10 is reset at flow chart box 59 and the timer 21 is reset to zero while the controller 22 begins its monitoring and controlling of the bearing lubricator 10.

Next, at flow chart box 60, the sensor 30 measures the temperature of the measured bearing 34, while at flow chart box 61, the timer 21 beings to measure the greasing time interval. The controller 22 and the application set points 57 can be adapted to require the temperature to reach a certain level (the parameter triggering value 24) and/or the desired greasing time interval to reach a certain amount (the desired greasing time triggering value) 53 before the bearing 34 or bearings 40 are greased.

Additionally, the flow chart 54 can provide, as shown in FIG. 1, to provide for a delay timer 62. The timer 62 can be user to delay the greasing of the bearings 40 for a time period such at the minimum time triggering value or certain delay time 55. This feature is helpful because the bearings 40 may experience an initially higher temperature until the excess grease is flung from the bearing element path. Additional unneeded greasing due to this phenomenon may be undesired. So simultaneously to when the bearing lubricator 10 is reset at flow chart box 59, the timer 21 is reset to zero, and the controller 22 begins its monitoring, the delay time 62 is started at flow chart box 63.

It should be appreciated that the controller 22 in the bearing lubricator 10 may be configured such that the minimum time triggering value or certain delay time 55 may be pre-programmed by the manufactured, by the lubricator installer or by the user.

Once the delay timer 62 has met its programmed delay time (the minimum time triggering value 55) flow chart box 64 is met and delay timer signal 65 is sent to controller 22.

Once the required temperature to reach a certain level (the parameter triggering value 24) has been met, first parameter triggering value met sensor signal 28 is sent to controller 22.

Once the desired greasing time interval to reach a certain amount (the desired greasing time triggering value 53) has been met, the desired greasing time signal 66 is sent to controller 22.

Once delay timer signal 65 is sent to controller 22 and when the selected one of either or both of the desired greasing time signal 66 and the sensor signal 28 is sent to the controller 22 (see "and" box 67 representing both sensor signal 28 and desired greasing time signal 67 being met), the mechanism 20 is energized and the bearings 40 are greased, as shown in flow chart box 68.

Once the bearing(s) 40 are greased, the desired greasing time interval controlled by timer 21 is reset at flow chart box 69. Simultaneously, the amount of grease used is noted and sent to controller 22 at flow chart box 70. Also, and simultaneously, the amount of grease used is subtracted from the total grease and sent to controller 22 at flow chart box 71.

Also, at flow chart box 60, if the temperature of the measured bearing 34 exceeds an excessive or shut-down value 72 of the parameter 26, the controller 22 of the lubricator 10 may energize alarm 31 at flow chart box 72. The alarm 31 may be connected to shut-down 25.

It should be appreciated that the bearing lubricator 10 may, as shown in FIG. 2, be provided with a second sensor 30A operably associated with the measured bearing 34. Note that the second sensor 30A may, alternatively, be located at any of the bearings 40. The controller 22 may be adapted to store a second parameter triggering value 24A of a second parameter 26A. The controller 22 may be further adapted to actuate the mechanism 20 when a second parameter triggering value met signal or second parameter sensor signal 28A indicative of the triggering value of the second parameter 26A is advanced to the controller 22.

The bearing lubricator 10 may be provided wherein the controller 22 is adapted to actuate the mechanism 20 only when the signal 28A indicative of the triggering value 24A of the second parameter 26A is advanced to the controller 22 and when signal 28 indicative of the triggering value 24 of the first parameter 26 is advanced to the controller 22. Alternative, the controller 22 may be adapted to actuate the mechanism 20 whenever either signal 28A or signal 28 are advanced to the controller 22.

Figure 3:
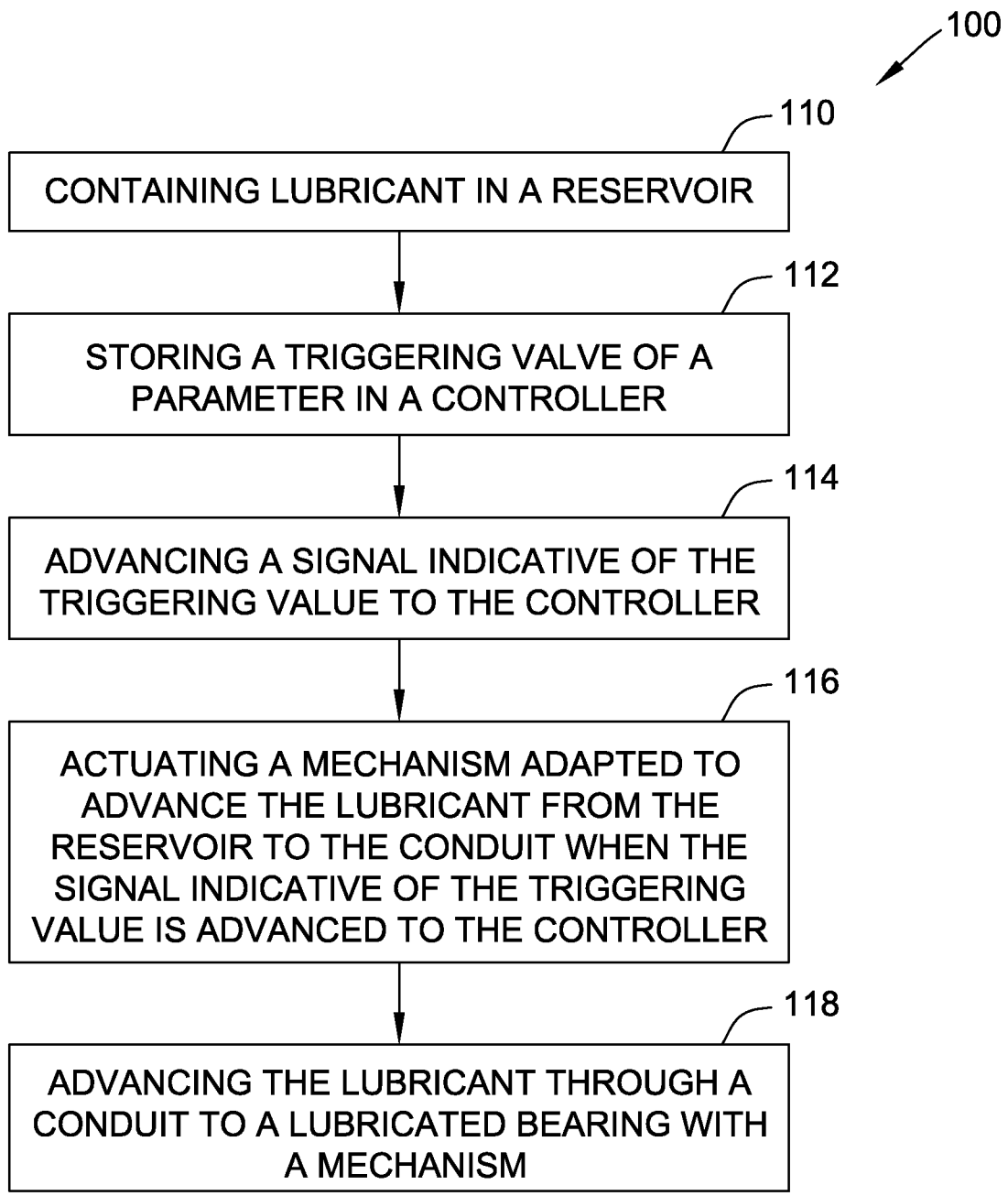
FIG. 3 is a schematic flow chart of a method for using the bearing lubricator of FIG. 1.

Referring now to FIG. 3 and according to another aspect of the invention, a method 100 for lubricating a lubricated bearing is provided. The method 100 includes the step 110 of containing lubricant in a reservoir, the step 112 of storing a triggering value of a parameter in a controller, and the step 114 of advancing a signal indicative of the triggering value to the controller. The method 100 also includes the, the step 116 of actuating a mechanism adapted to advance the lubricant from the reservoir to the conduit when the signal indicative of the triggering value is advanced to the controller, and the step 118 of advancing the lubricant through a conduit to a lubricated bearing with the mechanism.

Figure 4:
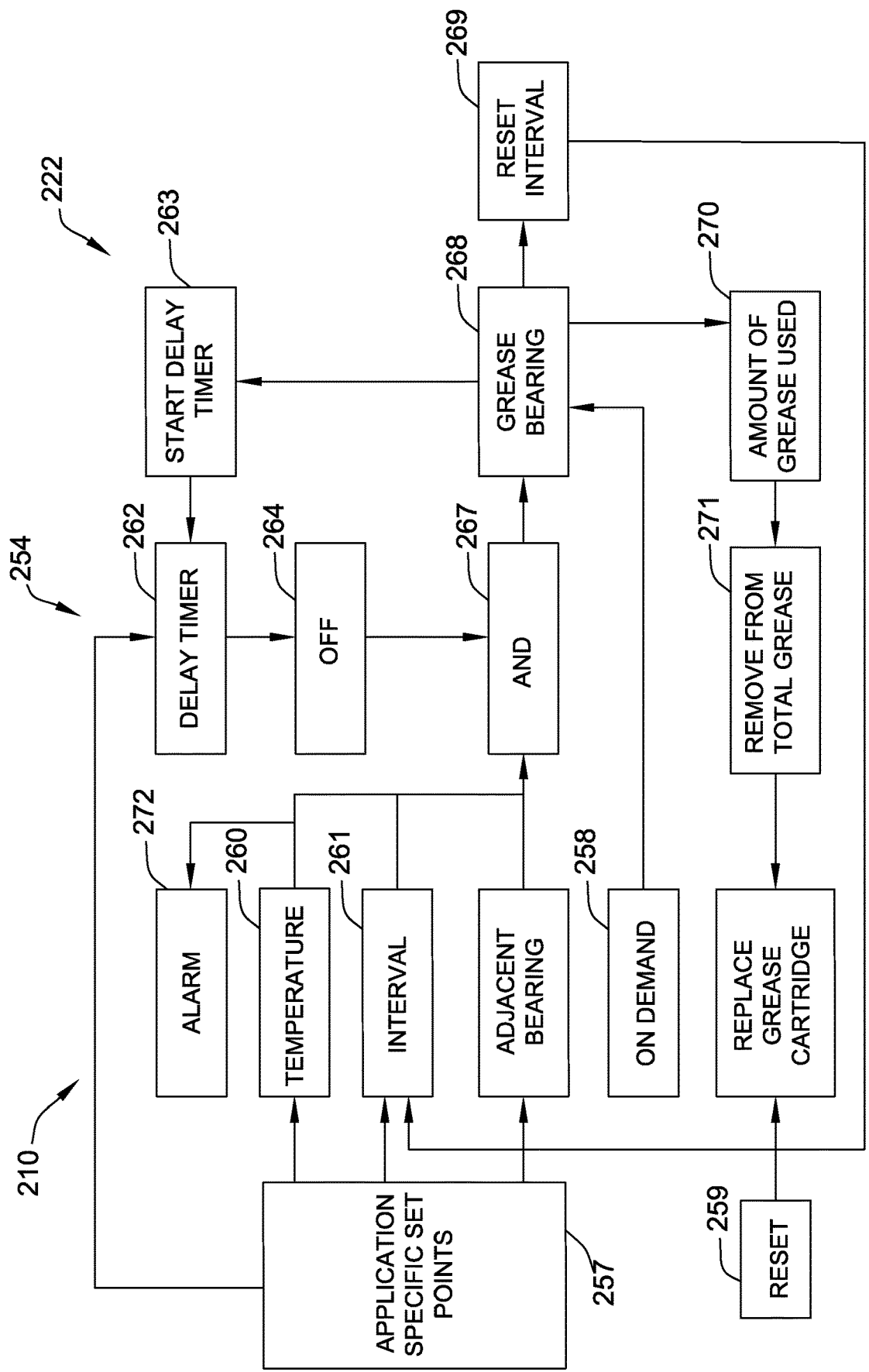
FIG. 4 is a plan view of another aspect of the present invention in the form of a bearing lubricator with monitored and unmonitored bearings.
Figure 5:
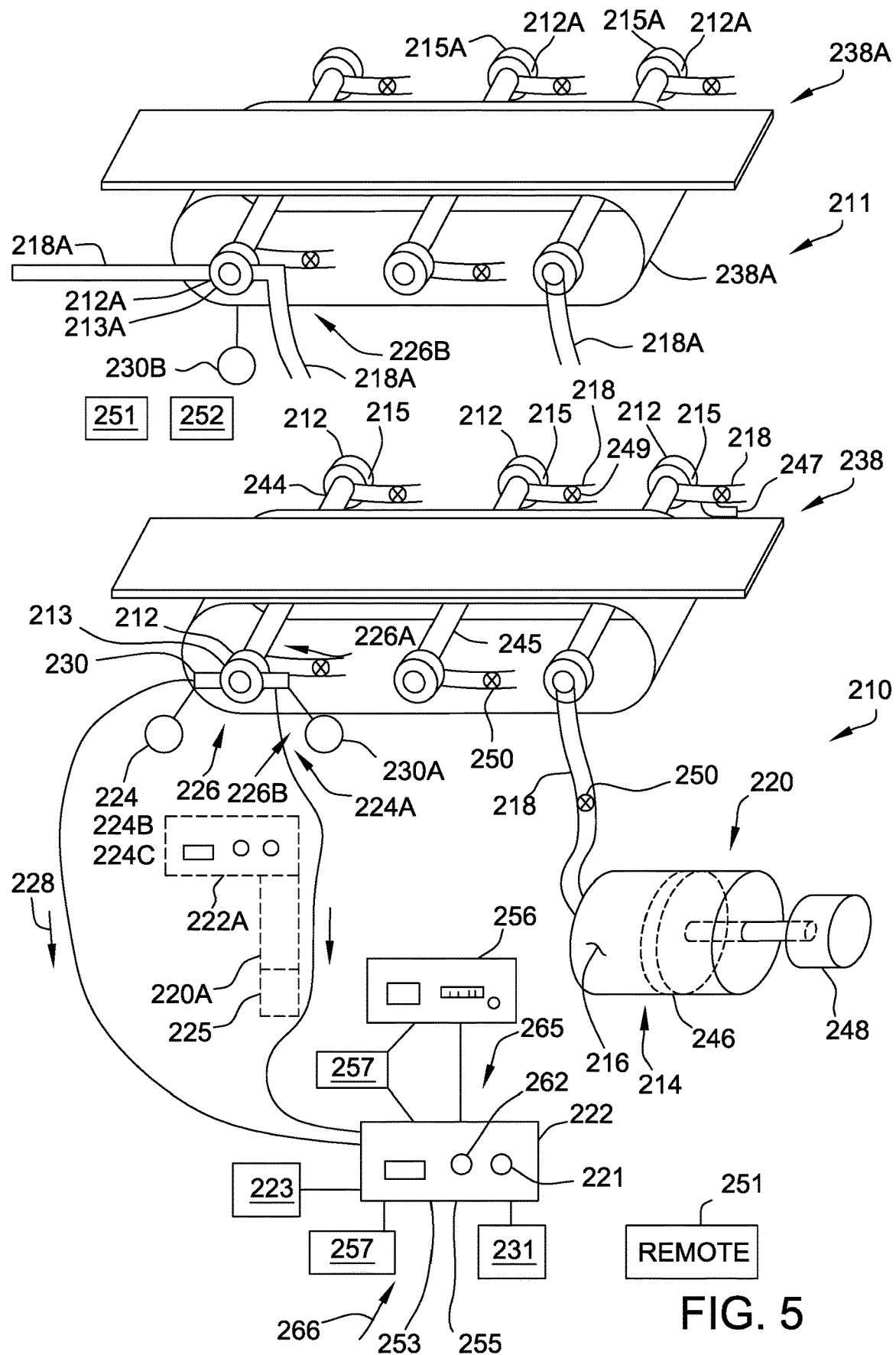
FIG. 5 is block diagram of the bearing lubricator of FIG. 4.

According to another aspect of the invention and referring to FIGS. 4 and 5, a bearing lubricator 210 for lubricating a plurality of device bearings 212 in a device 238 is provided. The plurality of device bearings 212 includes a solitary monitored bearing 213 and at least one unmonitored bearing 215. The bearing lubricator 210 includes a reservoir 214 configured to contain lubricant 216, a plurality of conduits 218 connecting the reservoir 214 to the plurality of device bearings 212, and a mechanism 220 connected to the reservoir 214 for advancing the lubricant 216 from the reservoir 214 to the plurality of device bearings 212 when actuated.

The bearing lubricator 210 may be utilized for lubricating any bearing in any application. The bearing lubricator 210 may be provided such that any number of bearings of any type are connected to the lubricator 210.

The bearing lubricator 210 further includes a first sensor 230 for sensing a first variable 226 of the monitored bearing 213 and a controller 222. The first sensor 230 may be connected to the controller 222. The sensor 230 is adapted to measure the first variable 226 of the monitored bearing 213. The first sensor 230 sends the first variable triggering value met signal or first variable sensor signal 228 to the controller 222 indicative of the value of the first variable 226.

The controller 222 stores a first variable triggering value 224 of the first variable 226 of the monitored bearing 213. The controller 222 further actuates the mechanism 220 to advance a quantity 216A of the lubricant 216 from the reservoir 214 to each of the plurality of device bearings 212 when a signal indicative of the variable is advanced to the controller and when that signal indicates the triggering value of the variable has been met. The quantity 216A of the lubricant 216 for each device bearing may be similar or identical, or may be different, if the lubricant quantity needed for each device bearing is predictable, based on the first variable 226 of the monitored bearing 213.

Note that the device bearings 212 receiving the lubricant 216 from the reservoir 214 include the monitored bearing 213 and at least one unmonitored bearing 215.

It should be appreciated that the triggering value 224 may be a lubrication trigger met value 224, when lubrication is to be provided by the lubricator 210 and/or when other conditions are met. Alternatively, the triggering value 224 may be a lubrication needed now or emergency triggering value 224B, when lubrication is to be provided by the lubricator 210 immediately and/or in a different quantity, for example, a greater quantity. Alternatively, the triggering value 224 may be a shut down or emergency triggering value 224C, when operation of the device 238 is in emergency or should be monitored more frequently or operated at a slower rate or speed.

The controller 222 of the bearing lubricator 210 may be further configured to provide for an emergency lubrication. When the first variable 226, the second variable 226A or any variable measured by the lubricator 210 reaches the lubrication needed now or emergency triggering value 224B, the controller 222 may be adapted to actuate the mechanism 220 immediately.

The bearing lubricator 210 may be further configured to provide for an emergency shut-down 225. The shut-down 225 may be a separate component or may, as shown, be a part of the controller 222. When the variable or parameter 226 measured by the sensor 230 of the lubricator 210 reaches the shut down or emergency shut down triggering value 224C, the shut-down 225 may be configured, for example, to stop, cycle down or otherwise disable the device 238.

While as shown in FIG. 5, the controller 222 is separated from the monitored bearing 213, for reasons including to provide simplicity and to reduce costs, the controller 222 may be in the form of a controller 222A, identical to controller 222 and positioned adjacent to or attached to the monitored bearing 213. A mechanism 220A similar to the mechanism 220 may be positioned adjacent the controller 222A.

The controller 222 of the bearing lubricator 210 may be configured such that the triggering value 224 of the first variable 226 may be pre-programmed and/or adjusted by the manufactured, by the lubricator installer or by the user.

According to another aspect of the invention, the bearing lubricator 210 may be provided wherein the solitary monitored bearing 213 and the at least one unmonitored bearing 215 are subjected to a similar load and/or a similar speed or condition where the lubrication needs of the monitored bearing are determined empirically, experimentally, by calculation or by simulation to be similar to or predictable based upon the variable sensed by the sensor of the monitored bearing 213.

For example, the lubricator 210 may be used in the device 238 wherein the device 238 may be any device and may be a device that utilizes many bearings that may be subjected to heavy loads and located in an environment with contamination that may harm the bearings. For example, the device 238 may, as shown, be a conveyor 238 for conveying loose materials, such as gravel or iron ore. The device 238 may similarly be a rolling mill for making steel sheet or other steel structural items.

The device bearings 212 on conveyor 238 may include a bearing that is located on the same shaft or axle 244 as that of the monitored bearing 213. As shown in FIG. 5, the bearing lubricator 10 may be provided wherein the bearing lubricator 10 lubricates both device bearings 212 located on the same shaft or axle 244, including the monitored bearing 213 and the unmonitored bearing 215. Not that in this arrangement, the monitored bearing 213 and the unmonitored bearing 215 are subjected to the same speed and similar loads making the first variable 226 of the monitored bearing 213 is a good indicator of the corresponding variable of the unmonitored bearing 215.

For example, for the device 238 in the form of the conveyor 238, the device beatings 212 may include an unmonitored lubricated bearing 215 on separate second shaft 245 that is spaced apart from the first shaft 244 that is supported by monitored bearing 213. In such arrangements, the monitored bearing 213 on the first shaft 244 and the unmonitored lubricated bearing 215 on the second shaft 245 are subjected to the same or similar speeds and loads. For these arrangements, the first variable 226 of the monitored bearing 213 a good indicator of the corresponding variable of the unmonitored bearing 215, even if the bearing 215 supports a different shaft than bearing 213.

The reservoir 214 and mechanism 220 may be specially made for this application or may be any reservoir and mechanism capable of storing and advancing lubricant, provided such a device may be controlled by controller 222.

The reservoir 214 may be generally cylindrical, although other shapes, such as rectangular, may be used.

The mechanism 220 may include a plunger or piston 246 that may be actuated by an electric motor 248 connected to controller 222. As the piston 246 slides inwardly in reservoir 214, the lubricant 216 is urged into conduits 218 attached to the reservoir 214.

The bearing lubricator 222 may be provided wherein the mechanism 220 may be adapted to advance the lubricant 216 from the reservoir 214 to the conduits 218 in a manner such that mechanism 220 may be adjusted to vary the amount of lubricant 216 advanced from the reservoir 214 when actuated. Such adjustment may be done manually within the mechanism 220 or using a valve or valves 250, Alternatively, the adjustment may be made automatically based on feedback from the first sensor 230 as programmed in the controller 220 or based on instructions inputted at a user interface 256.

The bearing lubricator 210 may further include one or more valves 250. The valves 250 serve to provide additional control of the amount of lubricant advancing toward the bearing downstream of the valve 250. To provide individual control and adjustment of lubricant to each device bearing 212, the bearing lubricator 10 may be configured as shown in FIG. 5 with the valve 250 positioned in the conduit 218 and associated with each device bearing 212.

It should be appreciated that the valves 250 may be manually set or automatically set by signals (not shown) from the controller 222 that controls electrically, hydraulic or pneumatic valve actuators 249 that open and close gates 247 of the valves 250. The valves 250 may be preset, manually or automatically so that lubrication is uniformly distributed to all device bearings 212 whenever the mechanism 220 is actuated. Alternatively, additional sensors including second sensor 230A may be used adjacent each or several of the device bearings 212 and feedback signals from these multiple sensors be sent to the controller 222 and the controller 222 sends signals back to the valves 250 so that the respective valves are individual adjusted for optimum greasing of each device bearing 212.

The controller 222 may be any controller capable of receiving signals from sensors or other devices, processing such signals and sending command signals to the mechanism 220 to actuate the mechanism 220 and lubricate the device bearings 212. The controller 222 may be specifically designed for this application or may be any suitable commercially available controller.

The bearing lubricator 210 may further include a timer 221. The timer 221 may be a separate component. Alternately, the timer 221 may, as shown, be a part of the controller 222. The timer 221 may be used, for example, to provide lubrication after a predetermined time or to prohibit lubrication too soon after a prior lubrication.

The bearing lubricator 210 may further include a lubrication actuator 223. The actuator 223 may be a separate component. Alternately, the actuator 23 may, as shown, be a part of the controller 222. The actuator 223 may be used, for example, to provide lubrication to the device bearings 212 when actuated, either manually or automatically.

According to another aspect of the invention, the bearing lubricator 210 may be configured such that additional variables such as second variable 226A are monitored by the bearing lubricator 210 to improve the effectiveness of the bearing lubricator 210. The additional variables may be monitored by additional sensors, for example by a second sensor 230A. The bearing lubricator 220 may be provided wherein the controller 220 is adapted to store a second variable triggering value 226A of the second variable 226A. The controller 220 may be further adapted to actuate the mechanism 220 when a signal indicative of the triggering value of the second variable 226A is advanced to the controller 222.

Note that the controller may utilize the signal indicative of the triggering value of the first variable 226 and the signal indicative of the triggering value of the second variable 226A in a computer program or algorithm to determine both lubrication timing and lubrication quantity.

According to another aspect of the invention and continuing to refer to FIG. 5, a system 211 is provided. The system 211 includes the first solitary monitored bearing 213 subjected to a first load cycle and a similarly loaded unmonitored bearing 215. The similarly loaded unmonitored bearing 215 is subjected to a second load cycle similar to the first load cycle. The system 211 includes bearing lubricator 210. The bearing lubricator lubricates the similarly loaded unmonitored bearing 215 and first solitary monitored bearing 213.

The bearing lubricator 210 includes reservoir 214 configured to contain lubricant 216 and a plurality of conduits 218 connecting the reservoir 214 to the similarly loaded unmonitored bearing 215 and to the first solitary monitored bearing 213. The bearing lubricator 210 also includes mechanism 220 connected to the reservoir 214 for advancing the lubricant 216 from the reservoir 214 to the similarly loaded unmonitored bearing 215 and to the first solitary monitored bearing 213 when actuated.

The bearing lubricator also includes a first solitary sensor 230 for sensing a variable of the first solitary monitored bearing 213 and a controller 222. The controller 222 stores a triggering value 224 of the first variable 226 of the monitored bearing 213. The controller 222 further actuates the mechanism 220 to advance a quantity of the lubricant 216 from the reservoir 214 to the similarly loaded unmonitored bearing 215 and to the solitary monitored bearing 213 when a signal indicative of the first variable 226 is advanced to the controller 222 and when that signal indicates the triggering value 224 of the variable 226 has been met.

Note that the system 211 may include a second device 238A that includes second device bearings 212A. The second device 238A may be a second conveyor or other device in which the second device bearings 212A are subject to similar loads to each other, but the loads may be different loads than the device bearings 212.

The second device 238A may include a second monitored bearing 213A that is monitored by controller 222 or by another controller (not shown). The second monitored bearing 213A may include a second device sensor 230B for sensing second device variable 226B. The second device 238A also includes second unmonitored bearings 215A. The second monitored bearing 213A and the second unmonitored bearings 215A are connected by second conduits 218A to the mechanism 220 or to another mechanism (not shown). It should be appreciated that system 211 may be used to lubricate any complicated installation of machines, equipment, etc. Note that by connecting all similarly loaded bearings at similar speeds, by connecting all bearings that have similar lubrication needs, or by connecting all bearings that have lubrication needs that may be predicted based on the parameter monitored by the sensor connected to the monitored bearing, a lubrication system may be provided with many fewer expensive sensors.

The first sensor 230, the second sensor 230A and the second device sensor 230B may be any sensor capable of sensing variable, parameter or characteristic 226, 226A, or 226B, respectively, of the monitored bearing 213 or 213A, respectively, of the device 238 or the system 211. Such variables, parameters or characteristics 226, 226A, or 226B may include temperature, vibration, general oxidation, humidity, oxygen, light, noise, atmospheric pressure, magnetic field, electric field, grease quantity, and grease quality. Sensors for such parameters or characteristics 226, 226A, or 226B may include, respectively, temperature sensors, vibration sensors, oxidation sensors, humidity sensors, oxygen sensors, light sensors, noise sensors, atmospheric pressure sensors, magnetic field sensors, and electric field sensors, grease quantity sensors, and grease quality sensors. It should be appreciated to keep a bearing properly lubricated, measuring the temperature and/or the vibration of the bearing may be particularly advantageous.

The lubricator 210 may further include an alarm 231. The alarm 231 may be operably connected to the sensor 230 and may be used to warn of excessive values of the variables, parameters or characteristics 226, 226A, or 226B, The alarm 231 may be connected to shut-down 225.

The controller 222 may be adapted to communicate with remote device 251. The remote device 251 may be attached physically to the controller 222 or may not be attached to the controller 222. The remote device 251 may be a computer, a smart phone, other controllers, other lubricators and/or the Cloud. Such communication may be through the user interface 256 or directly with the controller 222. Note that such indirect communication may be in addition to or instead of the user interface 256 connected to the lubricator 210.

The controller 222 may be adapted to communicate with the remote device 251 utilizing any available communication protocols. For example, the controller 222 may be adapted to communicate with the protocols of BLUETOOTH, wireless, ZIGBEE, 6LOWPAN, and/or HART.

FIG. 4 shows flowchart 254 for use with the lubricator 210 of FIG. 5. The controller 222 of the lubricator 210 may include the user interface 256. Alternatively, the user interface 256 may be a separate component.

The user interface 256 receives information from a user as to how the lubricator is to operate. For example, the user interface receives application specific set points 257. Such set points 257 may include grease capacity, grease application amount, apply grease temperature, minimum time between greasing, desired greasing interval, which bearings to control (apply grease).

When initiating operation of the bearing lubricator and after the application specific set points are set, the operator replaces the grease cartridge at flow chart box 258. The operator may then apply grease to the device bearings 212 by actuating the actuator 223 until the conduits 218 are filled and grease has sufficiently reached the bearings 212 as shown in the flowchart 254 at flow chart box 258.

Next, the bearing lubricator 210 is reset at flow chart box 259 and the timer 221 is reset to zero while the controller 222 begins its monitoring and controlling of the bearing lubricator 210.

Next, at flow chart box 260, the sensor 230 measures the temperature of the measured bearing 234, while at flow chart box 261, the timer 221 beings to measure the greasing time interval. The controller 222 and the application set points 257 can be adapted to require the temperature to reach a certain level (the parameter triggering value 224) and/or the desired greasing time interval to reach a certain amount (the desired greasing time triggering value 253) before the monitored bearing 213 and the unmonitored bearings 215 are greased.

Additionally, the flow chart 254 can provide, as shown in FIG. 4, to provide for a delay timer 262. The timer 262 can be user to delay the greasing of the bearings 212 for a time period such at the minimum time triggering value or certain delay time 255. This feature is helpful because the bearings 212 may experience an initially higher temperature until the excess grease is flung from the bearing element path. Additional unneeded greasing due to this phenomenon may be undesired. So simultaneously to when the bearing lubricator 210 is reset at flow chart box 259, the timer 221 is reset to zero, and the controller 222 begins its monitoring, the delay time 262 is started at flow chart box 263.

It should be appreciated that the controller 222 in the bearing lubricator 210 may be configured such that the minimum time triggering value or certain delay time 255 may be pre-programmed by the manufactured, by the lubricator installer or by the user.

Once the delay timer 262 has met its programmed delay time (the minimum time triggering value 255) flow chart box 264 is met and delay timer signal 265 is sent to controller 222.

Once the required temperature to reach a certain level (the parameter triggering value 224) has been met, first parameter triggering value met sensor signal 228 is sent to controller 222.

Once the desired greasing time interval to reach a certain amount (the desired greasing time triggering value 253) has been met desired greasing time signal 266 is sent to controller 222.

Once delay timer signal 265 is sent to controller 222 and when the selected one of either or both of the desired greasing time signal 266 and the sensor signal 228 is sent to the controller 222 (see "and" flow chart box 267 representing both sensor signal 228 and desired greasing time signal 266 being met), the mechanism 220 is energized and the bearings 212 are greased, as shown in flow chart box 268.

Once the bearing(s) 212 are greased, the desired greasing time interval controlled by timer 221 is reset at flow chart box 269. Simultaneously, the amount of grease used is noted and sent to controller 222 at flow chart box 270. Also, and simultaneously, the amount of grease used is subtracted from the total grease and sent to controller 222 at flow chart box 271.

Also, at flow chart box 260, if the temperature of the measured bearing 234 exceeds an excessive or shut-down value 224C of the variable 226, the controller 222 of the lubricator 210 may energize alarm 231 at flow chart box 272. The alarm 231 may be connected to shut-down 225.

Figure 6A:
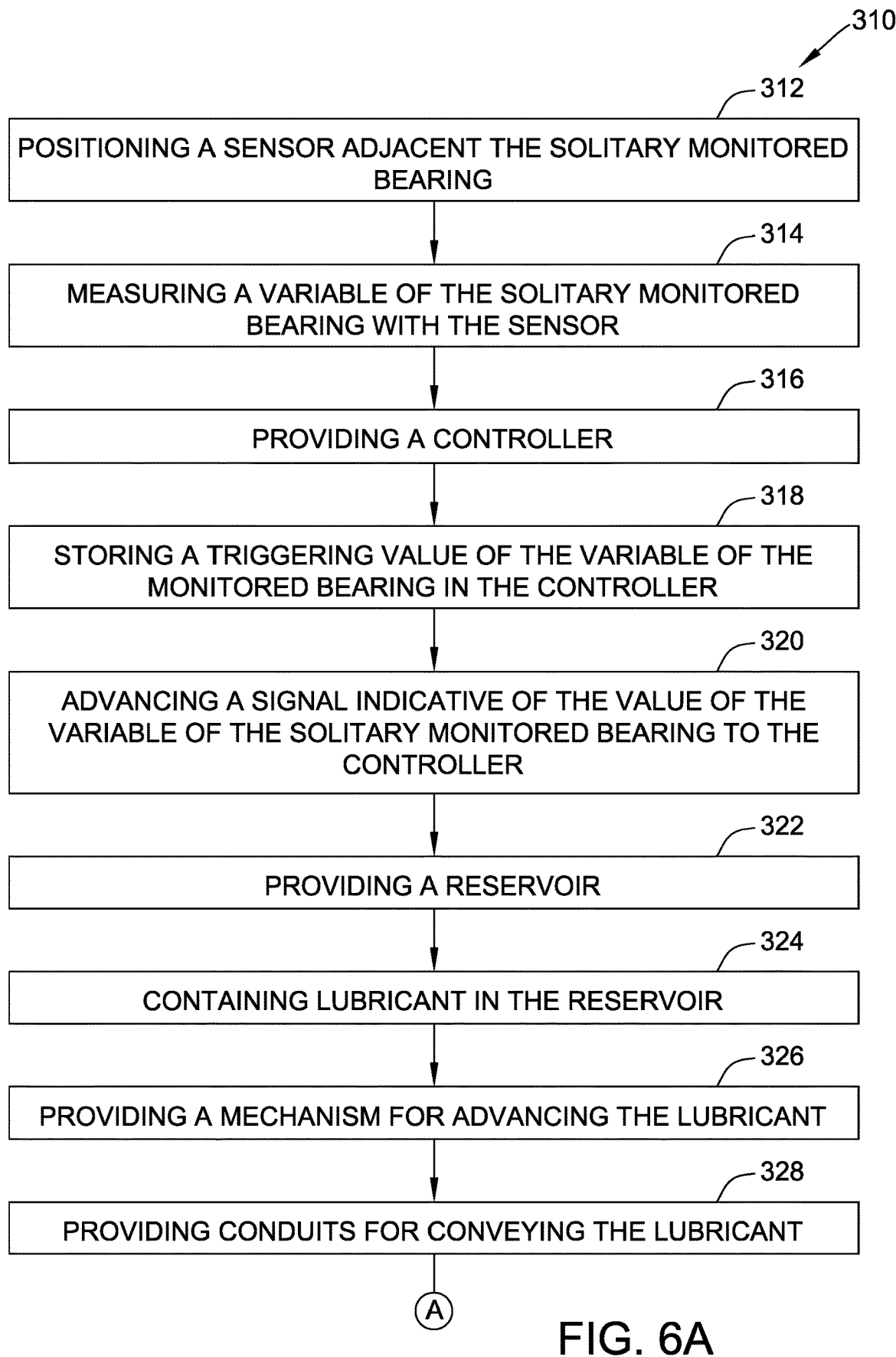
FIG. 6A is a first portion of a schematic flow chart of a method for using the bearing lubricator of FIG. 4.
Figure 6B:
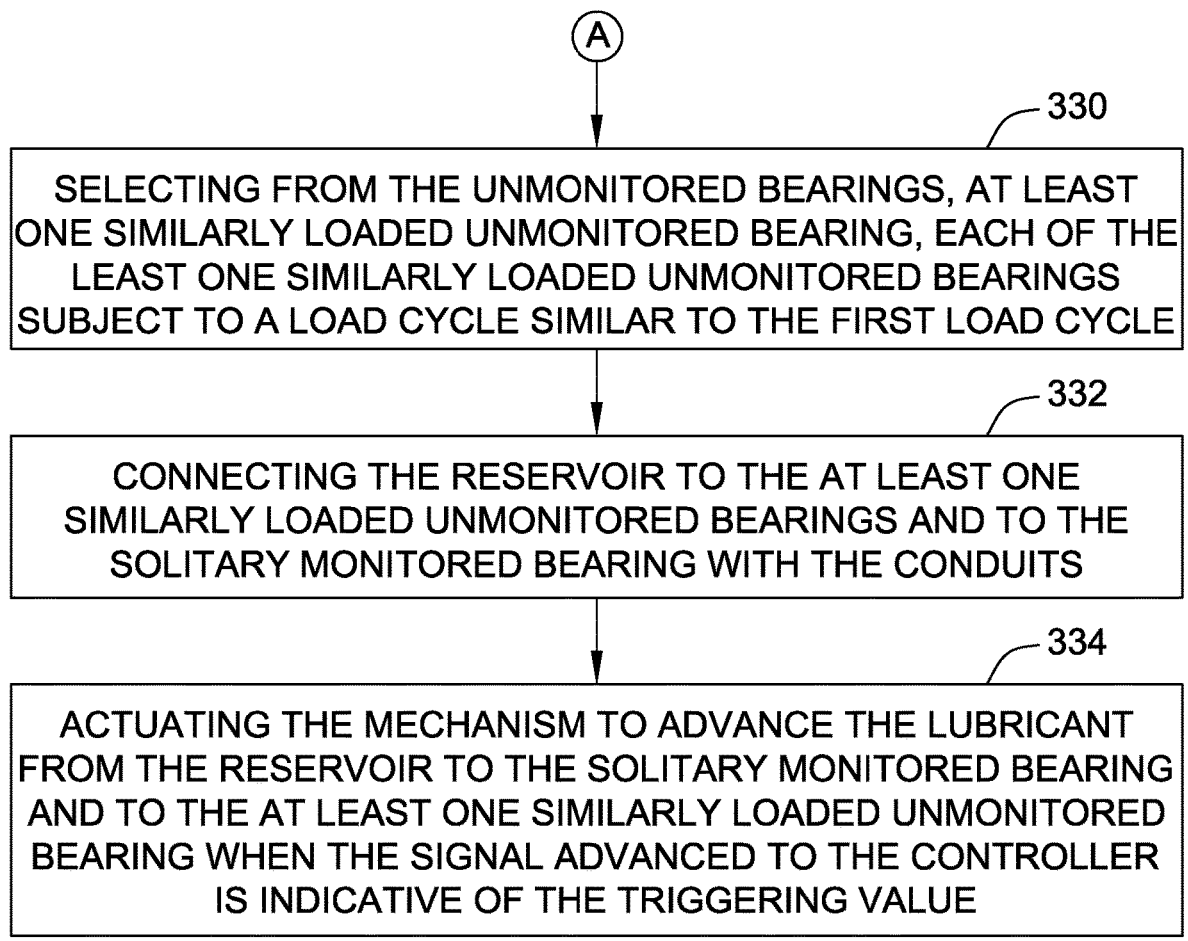
FIG. 6B is a second and final portion of the schematic flow chart of FIG. 4.

According to another aspect of the invention and referring to FIG. 6A and FIG. 6B, a 310 method for lubricating a plurality of device bearings in a device is provided. The plurality of device bearings includes a monitored bearing subjected to a first load cycle and at least one unmonitored bearing.

The method 310 includes step 312 of positioning a sensor adjacent the solitary monitored bearing and step 314 of measuring a variable of the solitary monitored bearing with the sensor and step 316 of providing a controller.

The method further includes the step 318 of storing a triggering value of the variable of the monitored bearing in the controller, step 320 of advancing a signal indicative of the value of the variable of the solitary monitored bearing to the controller, step 322 of providing a reservoir, and step 324 of containing lubricant in the reservoir.

The method further includes the step 326 of providing a mechanism for advancing the lubricant and step 328 of providing conduits for conveying the lubricant. The method further includes the step 330 of selecting from the unmonitored bearings, at least one similarly loaded unmonitored bearing. Each of the least one similarly loaded unmonitored bearings is subject to a load cycle similar to the first load cycle.

The method further includes the step 332 of connecting the reservoir to the at least one similarly loaded unmonitored bearings and to the solitary monitored bearing with the conduits and step 334 of actuating the mechanism to advance the lubricant from the reservoir to the solitary monitored bearing and to the at least one similarly loaded unmonitored bearing when the signal advanced to the controller is indicative of the triggering value.

According to another aspect of the invention, the method 310 may further include the steps of providing an adjustable timer for storing a delay time and preventing the actuation the mechanism with the controller until the delay time has elapsed after the previous actuation of the mechanism.

The methods, systems, and apparatus described herein facilitate the lubrication of a bearing and the monitoring of the bearing in a device. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing a mechanism and controller to monitor bearing condition and to provide lubrication to bearing or system of bearings. Furthermore, the exemplary methods system and apparatus achieve reduced maintenance costs while improving the reliability of the associated device. The methods, system and apparatus described herein may be used in any suitable application. However, they are particularly suited for devices or operations where bearings are subject to significant loading and difficult environments.

Exemplary embodiments of the lubricator and control are described above in detail. The lubricator and control and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing lubricator for lubricating a plurality of device bearings in a device, the plurality of device bearings including a solitary monitored bearing and at least one unmonitored bearing, said bearing lubricator comprising:
   a reservoir configured to contain lubricant;
   a plurality of conduits connecting the reservoir to the plurality of device bearings;
   a mechanism connected to the reservoir for advancing the lubricant from the reservoir to the plurality of device bearings when actuated;
   a solitary sensor for sensing a variable of the monitored bearing; and
   a controller, said controller stores a triggering value of the variable of the monitored bearing, said controller further actuates the mechanism to advance a substantially identical quantity of the lubricant from the reservoir to each of the plurality of device bearings when a signal indicative of the variable is advanced to the controller and when that signal indicates the triggering value of the variable has been met.

2. The bearing lubricator in accordance with claim 1, wherein the solitary monitored bearing and the at least one unmonitored bearing are subjected to a similar load and a similar speed.

3. The bearing lubricator in accordance with claim 1, wherein the solitary monitored bearing and the at least one unmonitored bearing support the same shaft.

4. The bearing lubricator in accordance with claim 1, wherein said controller is adapted to store a triggering value of a second parameter, said controller further adapted to actuate the mechanism when a signal indicative of the triggering value of a second parameter is advanced to the controller.

5. The bearing lubricator in accordance with claim 1, wherein said controller is adapted to actuate the mechanism only when a signal indicative of the triggering value of a second parameter is advanced to the controller and when a signal indicative of the triggering value of the variable parameter is advanced to the controller.

6. The bearing lubricator in accordance with claim 1, wherein the parameter comprises one of temperature, vibration, and grease oxidation.

7. The bearing lubricator in accordance with claim 1, wherein the mechanism adapted to advance the lubricant from the reservoir to the conduit may be adjusted to vary the amount of lubricant advanced from the reservoir when actuated.

8. The bearing lubricator in accordance with claim 1:
   wherein said controller includes an adjustable timer for storing a delay time; and
   wherein said controller prevents the actuation the mechanism until a delay time has elapsed after the previous actuation of the mechanism.

9. The bearing lubricator in accordance with claim 8, wherein the delay time may be pre-programmed.

10. The bearing lubricator in accordance with claim 1, wherein said controller is adapted to actuate the mechanism when a signal is received by the controller indicating an emergency lubrication is needed.

11. The bearing lubricator in accordance with claim 1, further comprising a second monitored bearing, spaced from the first mentioned solitary monitored bearing, wherein the lubricator is adapted to lubricate the second monitored bearing.

12. The bearing lubricator in accordance with claim 11, further comprising a second plurality of unmonitored bearings, spaced from the first mentioned plurality of unmonitored bearings, wherein the lubricator is adapted to lubricate the second plurality of unmonitored bearings when the second monitored bearing is lubricated.

13. The bearing lubricator in accordance with claim 1, wherein the controller is adapted to communicate with a remote device utilizing wireless communication protocols.

14. The bearing lubricator in accordance with claim 1, wherein the controller is adapted to communicate with at least one of a computer, a smart phone, other controllers, other lubricators and the cloud.

15. A system, said system comprising:
   a solitary monitored bearing subjected to a first load cycle;
   a similarly loaded unmonitored bearing, the similarly loaded unmonitored bearing subjected to a second load cycle similar to the first load cycle; and
   a bearing lubricator for lubricating the similarly loaded unmonitored bearing and for lubricating the solitary monitored bearing, said bearing lubricator comprising:
      a reservoir configured to contain lubricant;
      a plurality of conduits connecting the reservoir to the plurality of unmonitored bearings and to the solitary monitored bearing;
      a mechanism connected to the reservoir for advancing the lubricant from the reservoir to the similarly loaded unmonitored bearing and to the solitary monitored bearing when actuated;
      a solitary sensor for sensing a variable of the monitored bearing; and
      a controller, said controller storing a triggering value of the variable of the monitored bearing, said controller further actuating the mechanism to advance a quantity of the lubricant from the reservoir to the similarly loaded unmonitored bearing and to the solitary monitored bearing when a signal indicative of the variable is advanced to the controller and when that signal indicates the triggering value of the variable has been met.

16. The system in accordance with claim 15, further comprising a second similarly loaded unmonitored bearing, said second similarly loaded unmonitored bearing subjected to a third load cycle similar to the first load cycle.

17. The system in accordance with claim 15, wherein the solitary monitored bearing and the similarly loaded unmonitored bearing support the same shaft.

18. The system in accordance with claim 15:
   wherein said controller includes an adjustable timer for storing a delay time; and
   wherein said controller prevents the actuation the mechanism until a delay time has elapsed after the previous actuation of the mechanism.

19. A method for lubricating a plurality of device bearings in a device, the plurality of device bearings including a solitary monitored bearing subjected to a first load cycle and at least one unmonitored bearing, said method comprises the steps of:

positioning a sensor adjacent the solitary monitored bearing;
measuring a variable of the solitary monitored bearing with the sensor;
providing a controller;
storing a triggering value of the variable of the monitored bearing in the controller;
advancing a signal indicative of the value of the variable of the solitary monitored bearing to the controller;
providing a reservoir;
containing lubricant in the reservoir;
providing a mechanism for advancing the lubricant;
providing conduits for conveying the lubricant;
selecting from the unmonitored bearings, at least one similarly loaded unmonitored bearing, each of the least one similarly loaded unmonitored bearings subject to a load cycle similar to the first load cycle;
connecting the reservoir to the at least one similarly loaded unmonitored bearings and to the solitary monitored bearing with the conduits; and
actuating the mechanism to advance the lubricant from the reservoir to the solitary monitored bearing and to the at least one similarly loaded unmonitored bearing when the signal advanced to the controller is indicative of the triggering value.

20. The method in accordance with claim 19, further comprising the steps of:
providing an adjustable timer for storing a delay time; and
preventing the actuation of the mechanism with the controller until the delay time has elapsed after the previous actuation of the mechanism.

\* \* \* \* \*